United States Patent [19]
Taylor

[11] Patent Number: 5,479,270
[45] Date of Patent: Dec. 26, 1995

[54] METHOD AND APPARATUS FOR ALIGNING DEPTH IMAGES

[75] Inventor: Roy Y. Taylor, Scottsville, N.Y.

[73] Assignee: Eastman Kodak Company, Rochester, N.Y.

[21] Appl. No.: 885,411

[22] Filed: May 19, 1992

[51] Int. Cl.$^6$ .............................. H04N 9/07; G03B 27/32
[52] U.S. Cl. ................... 358/488; 355/22; 355/77
[58] Field of Search ................... 358/488, 43, 45, 358/44, 213, 88, 92; 355/22, 77; 354/406, 408, 402, 407, 115, 112, 114; 250/491.1, 492.1, 492.2; 430/17, 946, 340, 338, 332, 333, 292, 293, 945

[56] References Cited

U.S. PATENT DOCUMENTS

| | | | |
|---|---|---|---|
| 3,286,586 | 11/1966 | Whitney. | |
| 4,033,059 | 7/1977 | Hutton et al. | 40/137 |
| 4,318,123 | 3/1982 | Knop | 358/43 |
| 4,497,561 | 2/1985 | Suzuki | 354/406 |
| 4,546,380 | 10/1985 | Knop | 358/43 |
| 4,588,899 | 5/1986 | Erhardt | 250/491.1 |
| 4,600,297 | 7/1986 | Winnek. | |
| 4,668,080 | 5/1987 | Gale et al. | 355/51 |
| 4,903,069 | 2/1990 | Lam | 355/22 |
| 4,956,705 | 9/1990 | Wright. | |
| 5,034,982 | 7/1991 | Heninger et al. | 380/54 |
| 5,036,356 | 7/1991 | Lo | 355/77 |
| 5,076,687 | 12/1991 | Adelson | 356/4 |
| 5,113,213 | 5/1992 | Sandor et al.. | |
| 5,276,478 | 1/1994 | Morton | 355/22 |
| 5,278,608 | 1/1994 | Taylor et al. | 355/22 |
| 5,279,912 | -1/1994 | Teffer et al. | 430/17 |

FOREIGN PATENT DOCUMENTS 0058103 8/1982 European Pat. Off..

*Primary Examiner*—Paul Ip
*Attorney, Agent, or Firm*—Edward Dugas

[57] ABSTRACT

A method and apparatus which provides alignment lines adjacent to a lenticular image. The alignment lines are projected through a lenticular overlay and used to align the overlay to the image. The alignment apparatus uses a light sensor and a computer to detect either changes in brightness or changes in a Moire pattern of the lines to effect rotational alignment and to detect either centeredness of the lines or brightness changes in the lines to effect translational alignment as the overlay is rotationally or translationally moved with respect to the print by the computer. An increase in brightness indicates motion toward either rotational or translational alignment. A constant brightness along the lines indicates rotational alignment while a peak in brightness indicates translational alignment.

23 Claims, 13 Drawing Sheets

METHOD AND APPARATUS FOR ALIGNING DEPTH IMAGES

Cross References to Related Applications

This application is related to U.S. application entitled Electronically Interpolated Integral Photography System filed Jun. 21, 1991, having U.S. Ser. No. 07/722,713 and Kodak Docket No. 61,496 and incorporated by reference herein.

BACKGROUND OF THE INVENTION

1. Field of the Invention

The present invention is directed to a method and apparatus for aligning depth images with projection overlays and, more particularly, to aligning image lines of a lenticular print with lenticules of a lenticular overlay or faceplate using alignment lines adjacent to the print, printed parallel to the image lines and projected through one or more lenticules of the lenticular overlay or faceplate.

2. Description of the Related Art

A lenticular image fixed in a recording media, such as a photographic print or transparency media or displayed on a CRT display, comprises image lines interleaved from plural images. The image lines can be created by plural scan lines of a printer or display. A lenticular overlay or faceplate, including plural lenticules, when placed over the media and in proper alignment with the image lines projects the images at different viewing angles providing a picture with a sense of depth. Generating lenticular images in a recording media using a scan printer is described in the related application mentioned previously.

Film writers like the Symbolic Sciences International Fire 1000 and the Light Valve Technology Model 1620B available from Light Valve Technology a subsidiary of Eastman Kodak, which is a preferred printer, are controlled by computers to generate lines of pixels (also known as scan lines) by affecting a relative motion between a microscopically small light writing dot and the photographic media upon which the image is being recorded. The light level of the writing dot is modulated in accordance with pixel data in a computer image file. Since the data which modulates the light level is delivered out of the image storage device of the printer at the speed of the printer's computer clock, this is also referred to as the fast scan direction. After each scan line of information has been so written, the writing head and photographic media are translated relative to each other to a new scan line position parallel and adjacent to the written scan line. This motion only occurs after a full line of data in the fast scan direction has been recorded and is referred to as the slow scan direction. Generally, when lenticular prints are viewed, the orientation of the lenticules is vertical, i.e. the axes of the cylindrical lens segments run up and down relative to the viewer. As the viewer moves in a lateral direction, new perspective views are seen by each eye, thereby creating not only an autostereoscopic depth image, but some look-around effect as well. Each perspective view is a result of a set of exposed image or scan lines, one behind each lenticule, the composite of which comprises the entire view. As the eye is moved laterally, a new set of scanned lines becomes visible as a composite which in turn comprises the new perspective view.

It is possible to generate lenticular prints by scan printing across the sets of views that represent the entire horizontal angular range of the perspectives, but the dynamic range of image density changes along vertical scene lines are only a result of scene changes while the dynamic range along horizontal scene lines result from both scene changes and perspective changes. Therefore, to avoid taxing the film writer's recording dynamic range of density (which can be affected by the temporal frequency of the data flow), orienting the fast scan direction of the film writer with the vertical scene direction is preferable.

The variance in density and color differences between adjacent scan lines when generated as described in the previous paragraph is approximately equivalent for changes in perspective from picture 1 to picture 2, to that of picture 2 to picture 3, and so on to picture n-1 and picture n (where n is the number of scan lines under any given lenticule); but increases rapidly when the change in perspective from picture n to picture 1 is reached. This is not surprising because the angular differences between adjacent perspectives is substantially a small, constant amount, while the angular change from picture 1 to picture n is the entire horizontal angular range of perspectives.

This condition can also be described from the vantage of the print viewer. When carefully observed in a sequential fashion from view 1 to view n, image changes are preferably small and gradual as one might expect when viewing a real scene and slowly moving the head in a lateral direction. However, when moving past view n, suddenly view 1 of an adjacent lenticule becomes visible which constitutes an abrupt image or shift change back to the initial perspective. This effect is termed image break and represents a point in the angular space in front of a lenticular print where the primary image is no longer seen, and a satellite image is seen. The satellite images are equally valid representations of the object scene and serve to increase the total range of angular space that multiple viewers can simultaneously enjoy in a given lenticular picture. However, it is important that the primary image be properly centered to the lenticular array and that the scan lines and the lenticular axes be parallel to each other. If the primary image is not centered, it's projection space will not be centered on a normal to the print surface which leads to viewer confusion as to from where to view the print. If the scan lines are tilted slightly with respect to the lenticule axes, the image break is seen as an angled Moire pattern superimposed over the area image which detracts from the enjoyment of the display. As a result, a need exists for a method of accurately aligning the scan lines with the lenticules of the lenticular overlay.

SUMMARY OF THE INVENTION

It is an object of the present invention to rotationally and translationally align a lenticular overlay with a lenticular print.

It is another object of the present invention to provide a method that aligns based on brightness.

It is a further object of the present invention to provide a method that aligns by detecting changes in a Moire pattern.

It is also an object of the present invention to provide a method that automatically aligns an overlay and a print.

It is a further object of the present invention to provide alignment indicia that allow easy alignment of an overlay and a print.

It is still another object of the present invention to provide a method of aligning a lenticular print with a lenticular overlay which is adaptable to machine vision techniques to automate print assembly and verification.

It is an additional object of the present invention to provide a method of easy visual alignment of a lenticular overlay and a print.

The above objects can be attained by a method and apparatus which provides alignment lines adjacent to a lenticular print where the alignment lines are projected through a lenticular overlay or faceplate and used to align the overlay to the print. The alignment apparatus uses a camera and a computer to detect either changes in brightness of two vantage points along the alignment lines or changes in a Moire pattern of the lines to effect rotational alignment and to detect either centeredness of the lines or brightness to effect translational alignment.

These together with other objects of the two points and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
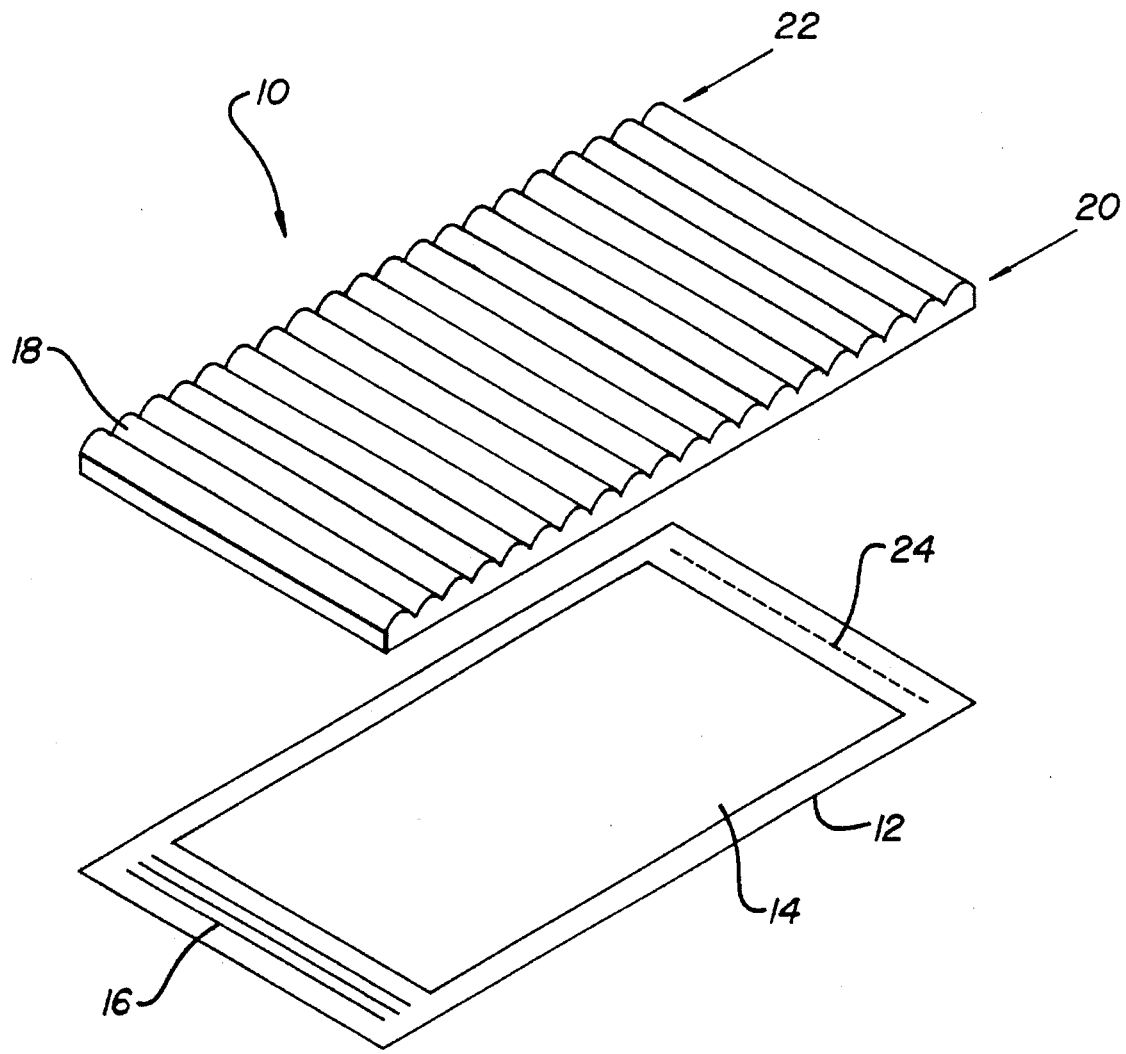
FIG. 1 illustrates features of the present invention.

The present invention, as illustrated in FIG. 1, involves aligning a lenticular overlay or faceplate 10 with a lenticular print or transparency 12. The overlay 10 is designed to be larger than the image portion 14 of the print 12, so that the overlay 10 covers one or more alignment lines 16 printed adjacent the image portion 14. The alignment line or lines 16 are shown as dark lines merely for convenience since in actual practice they are exposed scan lines and would typically appear white against a dark background image region border. Although alignment using a single alignment line is possible, in practice, when the brightness technique preferred and discussed herein is used, multiple lines (at least three) with dark spaces therebetween are preferred. The alignment lines 16 are preferably printed in the same direction as the scan lines used to print the image in the image region 14 and by the same device, and the scan lines are parallel to the view slices used to create the lenticular depth image when the print 12 is combined with the overlay 10. The lines 16 also preferably project through adjacent lenticules although projecting all the lines 16 through the same lenticule is possible.

As the overlay 10 and print 12 are rotated or translated with respect to each other, the image of the lines 16 projected through the lenticule 18 changes. To move the print and overlay with respect to each other, as will be discussed in more detail hereinafter, the print 12 is held in a stationary position and the overlay 10 is moved preferably by providing motion to the overlay 10 from one or both of lenticular alignment contact points 20 and 22. It is of course possible to hold the overlay 10 still and move the print 12 or move both the overlay 10 and print. If the overlay contact points 20 and 22 are moved simultaneously in the same direction, translation occurs, if one of the alignment contact points 20 and 22 is held stationary and the other moved, rotational motion occurs, while if one contact point is moved in one direction and the other contact point is moved in another direction, rotational movement also occurs. Optional second alignment lines indicated by the dashed line 24 can also be provided. A higher accuracy of alignment can be obtained by differentially comparing the projected images for lines 16 and 24. The lines 16 and 24 should be viewed at complementary angles to provide the most accurate differential comparison.

Figure 2A:
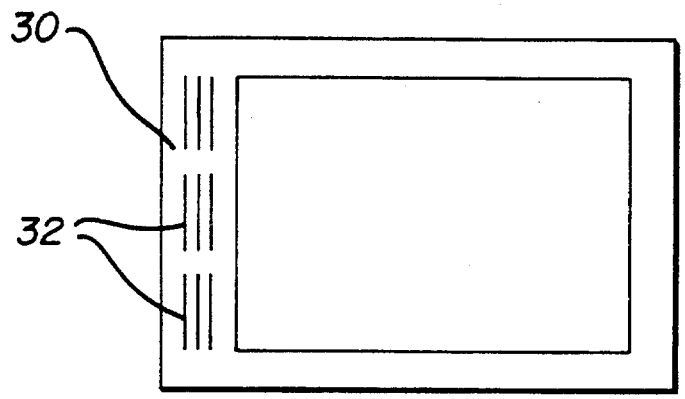
FIGS. 2a–2d illustrate characteristics used by the present invention in determining rotational alignment.
Figure 2B:
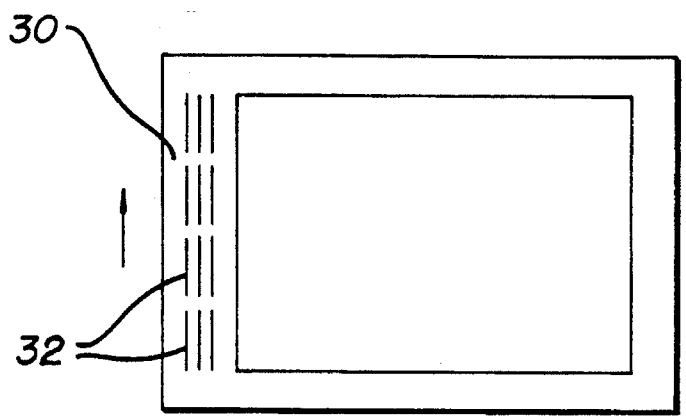
Figure 2C:
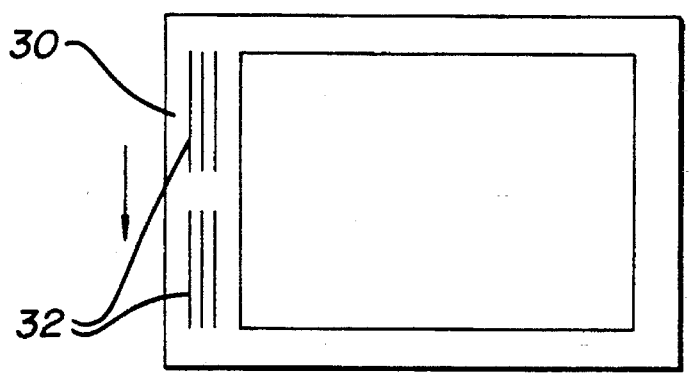
Figure 2D:
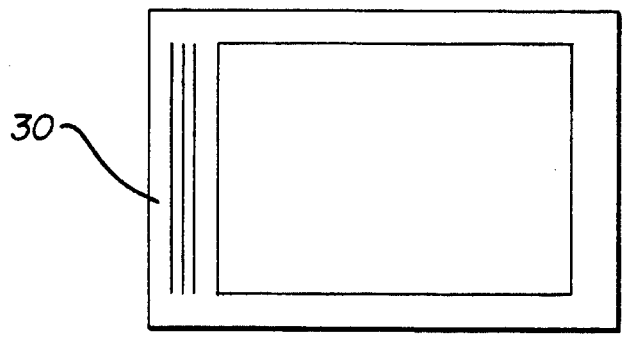

When the print 12 is rotationally misaligned with respect to the overlay 10, as illustrated in FIG. 2a, a Moire pattern 30 of the lines 16 will be projected by the lenticules 18. As the overlay 10 and print 12 are rotated with respect to each other, the Moire pattern 30 changes as illustrated in FIG. 2b. FIG. 2b illustrates an increase in the rotational misalignment of the overlay 10 with the print 12. In FIG. 2b the Moire pattern 30 has an increased number of gaps between the line segments 32 as compared to FIG. 2a. The light produced or projected by the overlay 10 by the Moire pattern 30 of FIG. 2b is less bright than the light produced by the Moire pattern of FIG. 2a because more gaps appear in the pattern. That is, as the overlay 10 and print 12 become more misaligned, the overall brightness produced by the white lines 16 through the lenticules 18 decreases. In addition, as can be seen in FIG. 2b, the number of breaks or gaps in the lines increases and the distance between the gaps also decreases as the rotational misalignment is increased. If the print 12 and the overlay 10 are rotated with respect to each other at a constant rate, the frequency at which the gaps in the lines or the lines themselves pass a particular position in the image increases whenever the rotational misalignment increases. Further, the direction of movement of the gaps or lines as indicated by the arrow is in a particular direction as the rotational misalignment further increases. FIG. 2c illustrates an improvement in alignment with respect to both FIGS. 2a and 2b. As can be seen the number of gaps has decreased, the direction of motion of the gaps as indicated by the arrow is opposite to that shown in FIG. 2b and since the lines projected are white the brightness of the projected lines also increases. When the print 12 and overlay are relatively rotated at a constant rate from FIG. 2b through FIG. 2a to FIG. 2c the frequency at which the gaps or the brightness peaks in the lines of the Moire pattern decreases until, as illustrated in FIG. 2d, the Moire pattern 30 disappears. FIG. 2d also corresponds to the maximum or peak brightness produced by the lines 16 projecting through the overlay 10. If two vantage points along the lines are chosen to measure brightness when both points are equal and at a maximum then the image is aligned.

Figure 3:
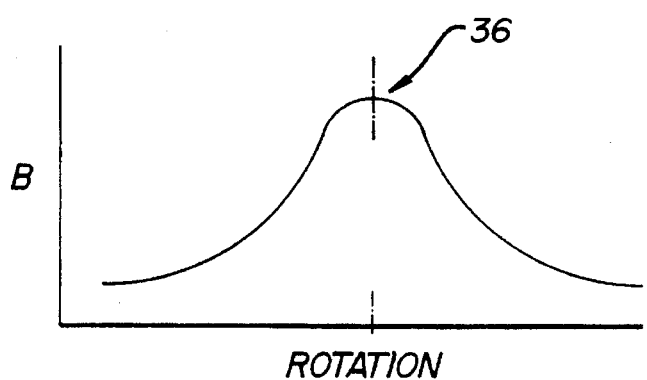
FIG. 3 illustrates the relationship between rotational position and brightness.

If the brightness is measured as a function of rotation a curve such as FIG. 3 will be produced. When the brightness reaches a peak 36 and is substantially constant along the alignment lines, the print and 12 and overlay 10 are in rotational alignment. Using the principle of FIG. 3 if a conventional sensing device, such as a camera or a single light sensitive element, is aligned to view the lines 16 through the overlay 10 and the view by the sensor is sufficient to encompass an unbroken length of the alignment lines, then the overall brightness of two points along the lines, particularly the peak in the overall brightness, can be used to determine rotational alignment.

Figure 4:
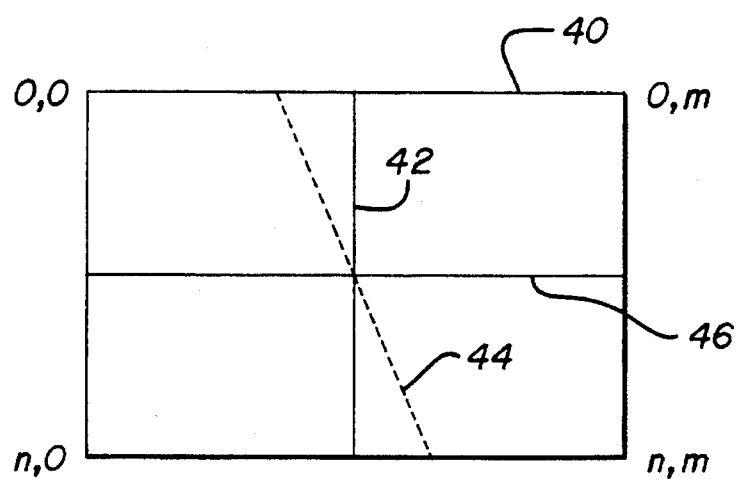
FIG. 4 depicts the relationship between an array of sensors and an orientation line.
Figure 5A:
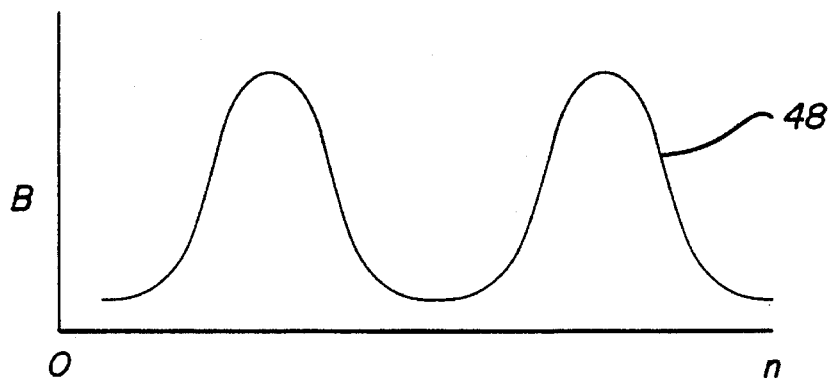
FIGS. 5a–5d illustrate brightness along a scan line direction which can be used in detecting rotational alignment.
Figure 5B:
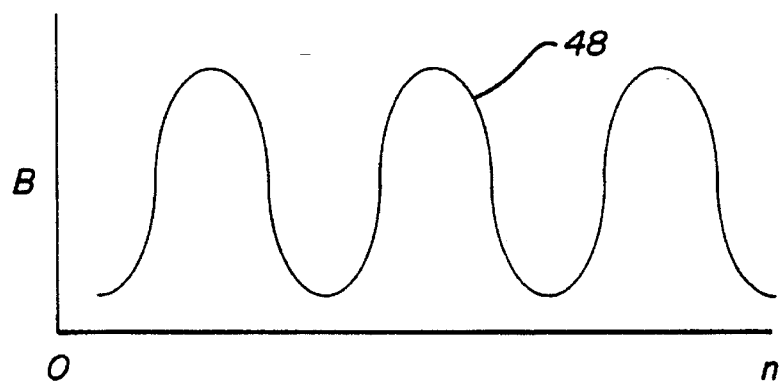
Figure 5C:
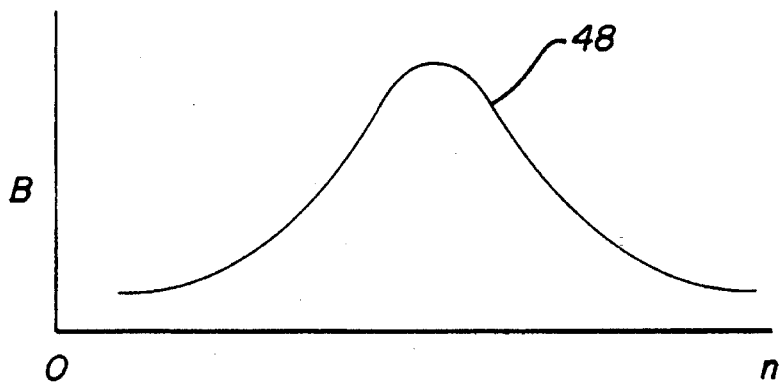
Figure 5D:
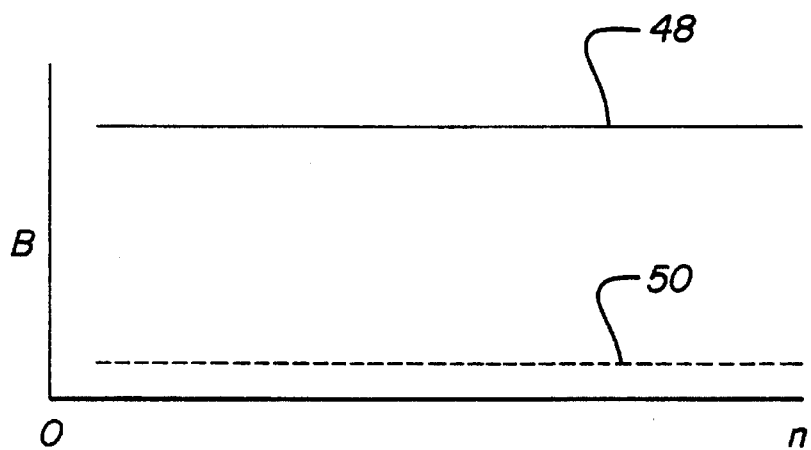

Frequently, image sensors, rather than being a single photosensitive element, as could be used with respect to detecting overall brightness as illustrated in FIG. 3, include an n by m array of light sensing elements as illustrated by sensor 40 in FIG. 4. When the sensor 40 is oriented so that a line of the sensing elements is generally in parallel with the aligned lines 16 in a lenticular print 12, the lines 16 projected through the overlay 10 will fall along a line 42 of the sensor 40 as illustrated in FIG. 4. Since the image projected onto sensor 40 of the one or more lines 16 could cover one or more light sensing elements, the line 42 is intended to represent light sensing elements sensing the peak brightness in the projected line 16. If the projected image is slightly misaligned with respect to the array 40 as depicted by dashed line 44, the misalignment can be detected by performing a row scan of each of the rows of sensors in the sensor array 40 looking for the peak in brightness. The peak in brightness location or the column index for that particular row can be used to correct for the misalignment of the projected image on the sensor 40, such that the light sensing elements which detect the peak in brightness across the width of one of the lines 16 can be sampled. If the pixels along the line 42 of maximum brightness are sampled for the entire height of the lines of the Moire pattern 30 or a sensor 40 views a significant portion of the Moire pattern 30 or the sensor 40 views at least one complete line segment of the Moire pattern 30, the brightness value in the direction along line 42 will vary as illustrated by brightness curve 48 in FIGS. 5a–5d. FIG. 5a corresponds to the alignment position of FIG. 2a, FIG. 5b corresponds to the alignment position of FIG. 2b, 5c corresponds to the rotational alignment position of FIG. 2c and FIG. 5d corresponds to the alignment position of FIG. 2d. The dashed line 50 depicts the minimum brightness level and line 48 in FIG. 5d is at the maximum brightness level. As can be seen when the brightness sensed by a line of light sensing elements in the sensor 40 oriented along the scan line direction of lines 16 is saved, a conventional curve fitting analysis which fits a straight line to the data (curve 48) will identify when the overlay 10 and print 12 are in alignment. Further, the sharper the peak of the curve 48, as illustrated by FIGS. 5a–5c, the more rotationally misaligned the overlay 10 and print 12 are with respect to each other. That is, comparing the shape of the brightness curve 48 from rotational position to rotational position can be used to determine the direction of rotation to increase alignment and to determine when alignment occurs. Further, when all sensing elements along the line 42 reach the same maximum brightness level alignment exists. It is also possible, using conventional curve fitting prediction techniques, to obtain three curve samples at different rotational positions and determine the amount of rotation necessary for alignment. Rotation by that amount results in alignment. Further, since the gaps in the lines disappear when alignment occurs, conventional, line segment detection methods can be used to determine alignment by detecting continuous lines.

Figure 6:
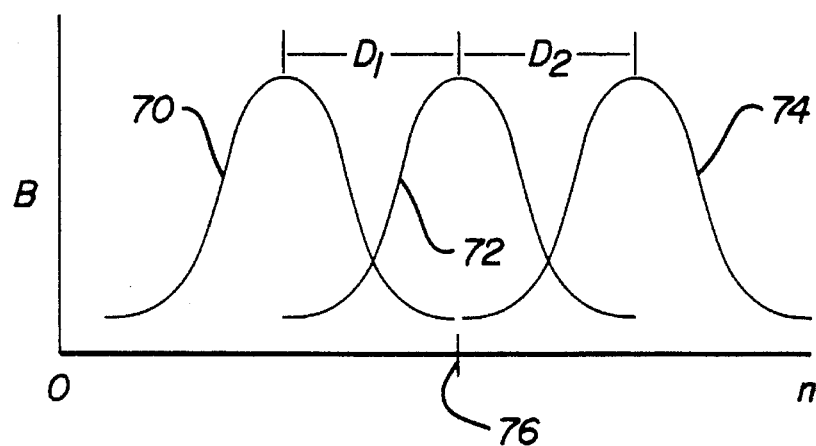
FIG. 6 illustrates a distance or frequency changes in line spacing in a Moire pattern which can be used to detect rotational alignment.

Determining rotational alignment using the distance between peaks in brightness of the line segments of the Moire pattern 30 or the distance between gaps is illustrated in FIG. 6. FIG. 6 shows the brightness peaks moving across the sensor 40 such that the distance between the peaks of the curves 70, 72 and 74 is changing. When the distance D1 is greater than the distance D2 and the curves are sampled in time in the order of curve 70, 72 and 74, the overlay 10 is moving into closer alignment with the print 12. When the distance D1 is less than the distance D2 the misalignment is getting greater. In addition, as illustrated by FIG. 6, if the time between the sampling and storage of curves 70, 72 and 74 is constant then the number of peaks which move past any given point in the line 42 of light sensing elements of sensor 40, such as point 76, can be counted resulting in a count value corresponding to rotational alignment. If the count is decreasing the misalignment is also decreasing while if the count is increasing the misalignment is also increasing. Of course it is possible to continuously monitor the Moire pattern with respect to a particular position along line 42 and count the peak transitions with respect to time and obtain a true frequency value and use the changes in the true frequency to determine alignment.

Figure 7A:
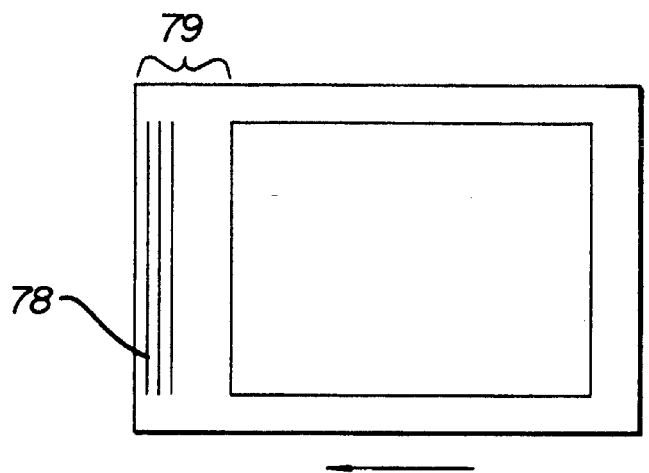
FIGS. 7a–7c illustrate characteristics of an image used during translational alignment.
Figure 7B:
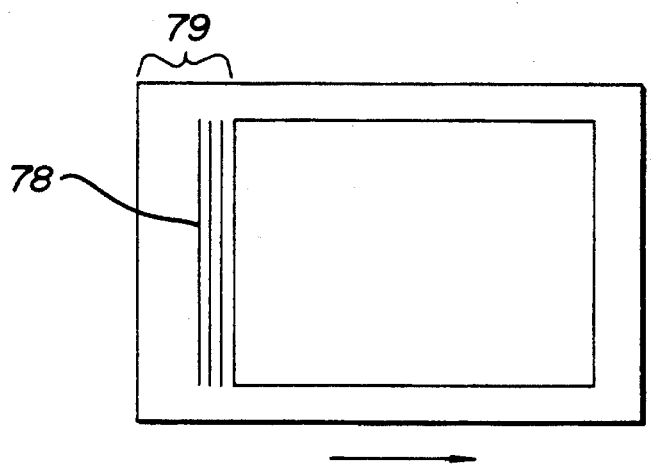
Figure 7C:
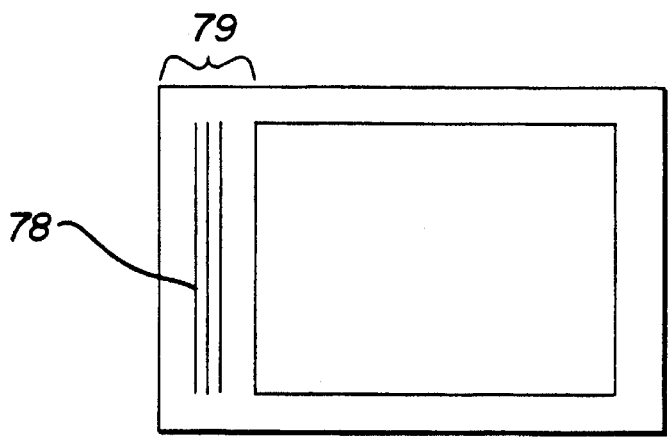

It is preferable that a rotational alignment be performed before translational alignment. FIGS. 7a–7c illustrate image projection principles which will be used to determine translational alignment. FIG. 7a illustrates the projected alignment lines 78 projected to the left of the center of the space 79 in which the alignment lines are printed on the print 12. Alignment lines projected visibly to the left of the center require that the print 12 be moved to the left with respect to the overlay to be properly aligned. FIG. 7b illustrates alignment lines projected to the right requiring that the overlay 70 be moved to the right with respect to the print 12 to improve translational alignment. FIG. 7c illustrates an aligned print in which the projected image lines appear in the center of the space 79 as they actually do in print 12. If a sensor is aligned over the alignment lines 16 of print 12, such that the entire width of the area in which the alignment lines 16 on print 12 are positioned is viewed or if only a portion of the width is viewed then the overall brightness or a brightness curve can be used to determine alignment. FIGS. 7a and 7b illustrate image and translational positions which result in a lower brightness sensed by the sensor 40 than in the alignment position illustrated in FIG. 7c.

Figure 8:
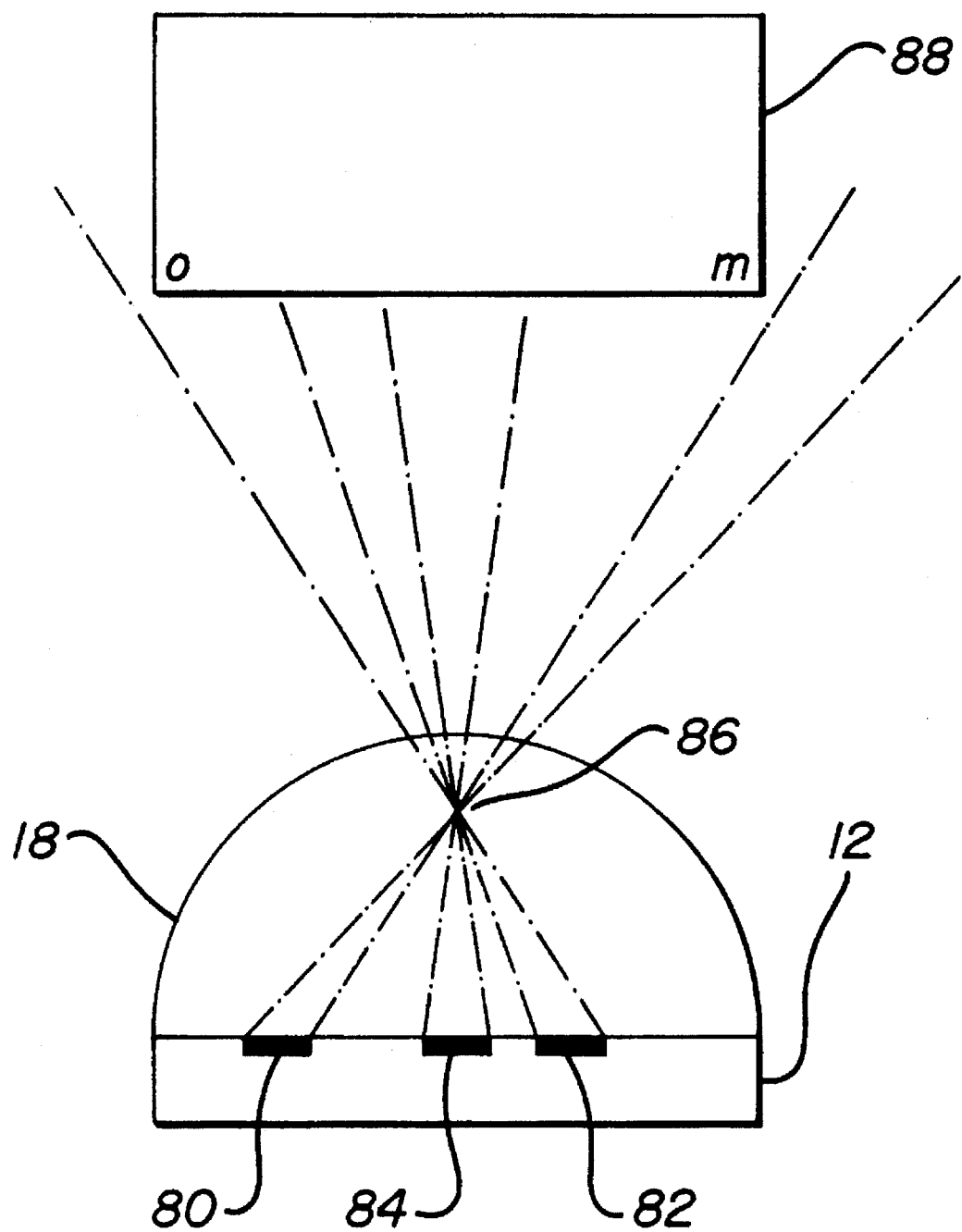
FIG. 8 illustrates the principles of translational alignment.

FIG. 8 illustrates the principles behind the translational alignment illustrated in FIG. 7a–7c. FIG. 8 illustrates a lenticule 18, the print 12 and three translational positions 80, 82 and 84 of the alignment line or lines 16 with respect to the lenticule 18. Because the lenticule 18 is a lens the lenticule 18 focuses the image of the lines 16 in a direction dependent upon the relationship between the nodal axis 86 of the lenticule 18 and the position of the lines. As can be seen when the lines 16 are in position 80, the projected image completely misses the sensor 88 to the right. If the sensor 88 is a single overall brightness sensor, then the brightness sensed by the sensor is very low depending upon the ambient brightness of the environment. When the print is translated such that the alignment lines 16 are in position 82, a portion of the image of the alignment lines falls on sensor 88. If sensor 88 is a single light sensing element then the brightness sensed by the sensor 88 is greater than that when the lines 16 are in position 80. That is, the brightness value of position 82 increases as compared to position 80. If the sensor 88 is an array sensor, such as illustrated in FIG. 4, a number of the light sensing elements of the sensor 88 will be illuminated and a curve of brightness values will be produced when the light sensing element brightness values are sampled. Position 84 is a position at which the image lines are projected on to the center of the sensor 88 resulting in the highest brightness value. If the image lines 16 include more than one line, then several lines will be detected by an array type sensor 40.

Figure 9:
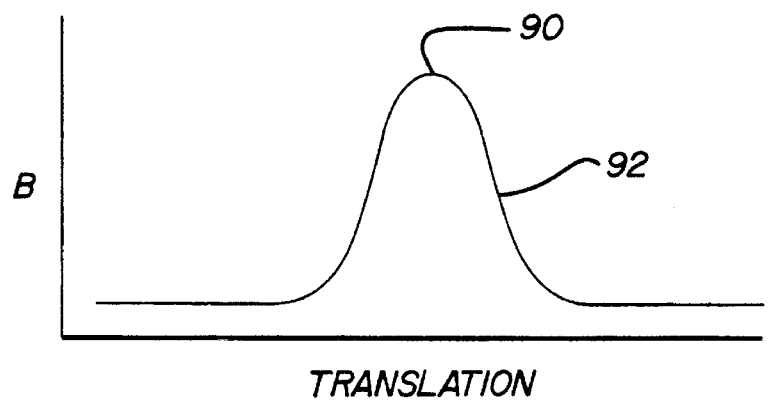
FIG. 9 illustrates brightness with respect to translation.
Figure 10A:
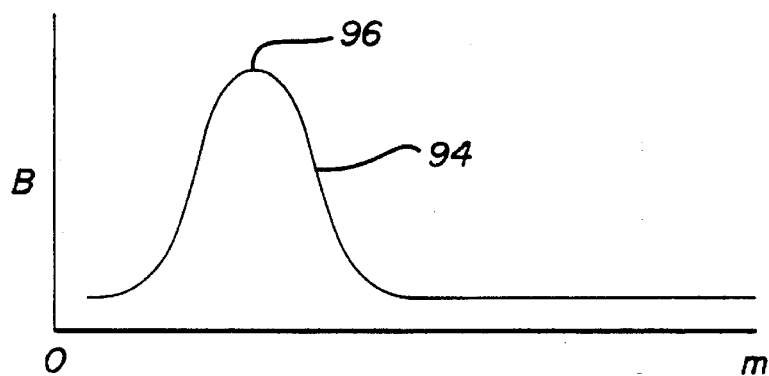
FIGS. 10a and 10b illustrate alignment characteristics during translational alignment.
Figure 10B:
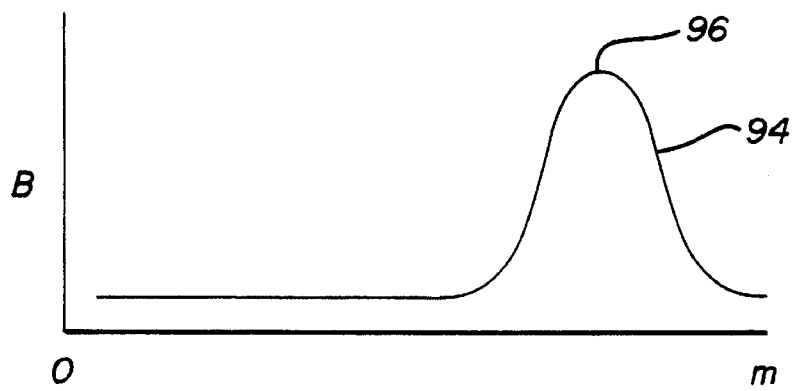
Figure 10C:
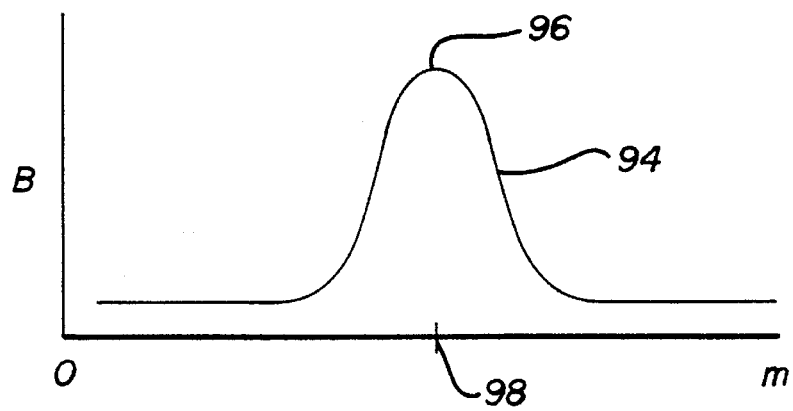

When the overall brightness is used for translational alignment, that is a single light sensing element viewing the entire area of the alignment lines is used, the brightness with respect to translational position, when sampled over several translation positions, will appear as illustrated in FIG. 9. The peak 90 in the curve 92 corresponds to an aligned translation position. When an array sensor, such as that illustrated in FIG. 4, is used and a row of the light sensing elements, such as row 46, is selected to sample a brightness curve, the curve 94 will change in accordance with FIGS. 10*a*–10*c* when the alignment lines are in the corresponding misaligned and aligned positions of FIGS. 7*a*–7*c*. That is, when the translational alignment is correct, the peak 96 in the brightness value sampled by the row 46 of light sensing elements in sensor 40 will be centered 98 on the row 46 as illustrated in FIG. 10*c*.

Figure 11A:
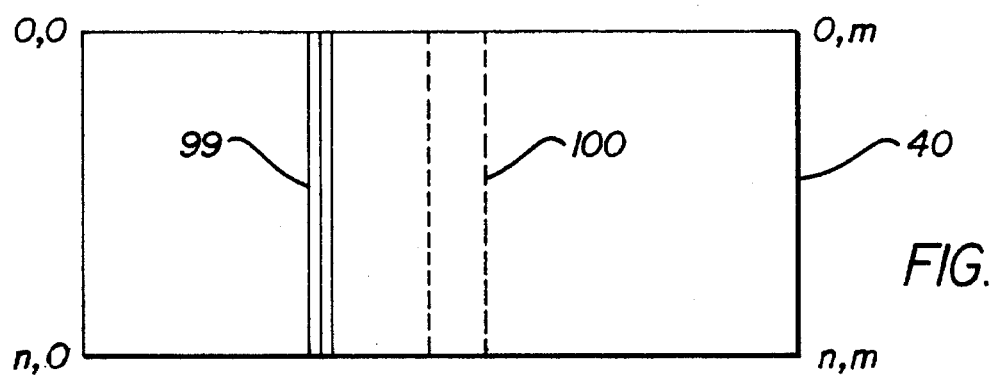
FIGS. 11a and 11b illustrate another translational alignment technique.
Figure 11B:
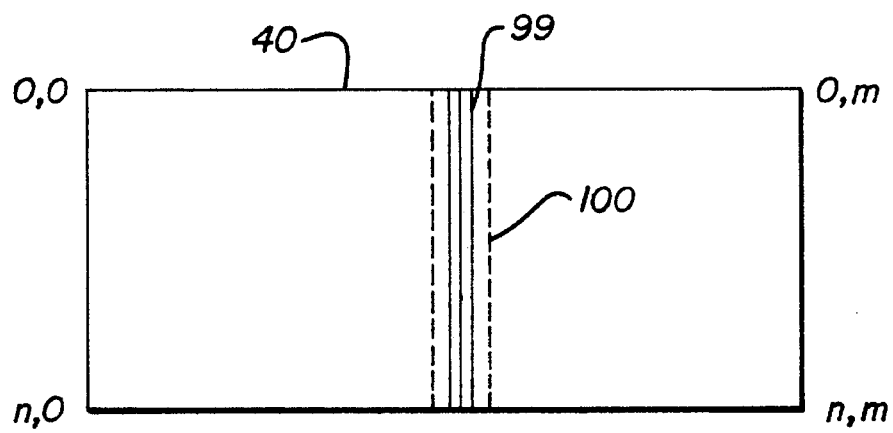

FIGS. 11*a* and 11*b* illustrate a still further method of determining sensor alignment. If an array type light sensing element, such as sensor 40, is accurately registered with respect to the print 12, that is, when the image is in alignment, the projected image lines 99 should fall within a region 100. FIG. 11*a* illustrates a misaligned position where the alignment lines 99 fall outside of the area 100 while FIG. 11*b* illustrates an aligned position. That is, when the alignment is proper the projected alignment lines 99 will be projected onto preferred ones of the light sensing elements of the array 40. When this condition exists, translational alignment is accomplished.

Figure 12:
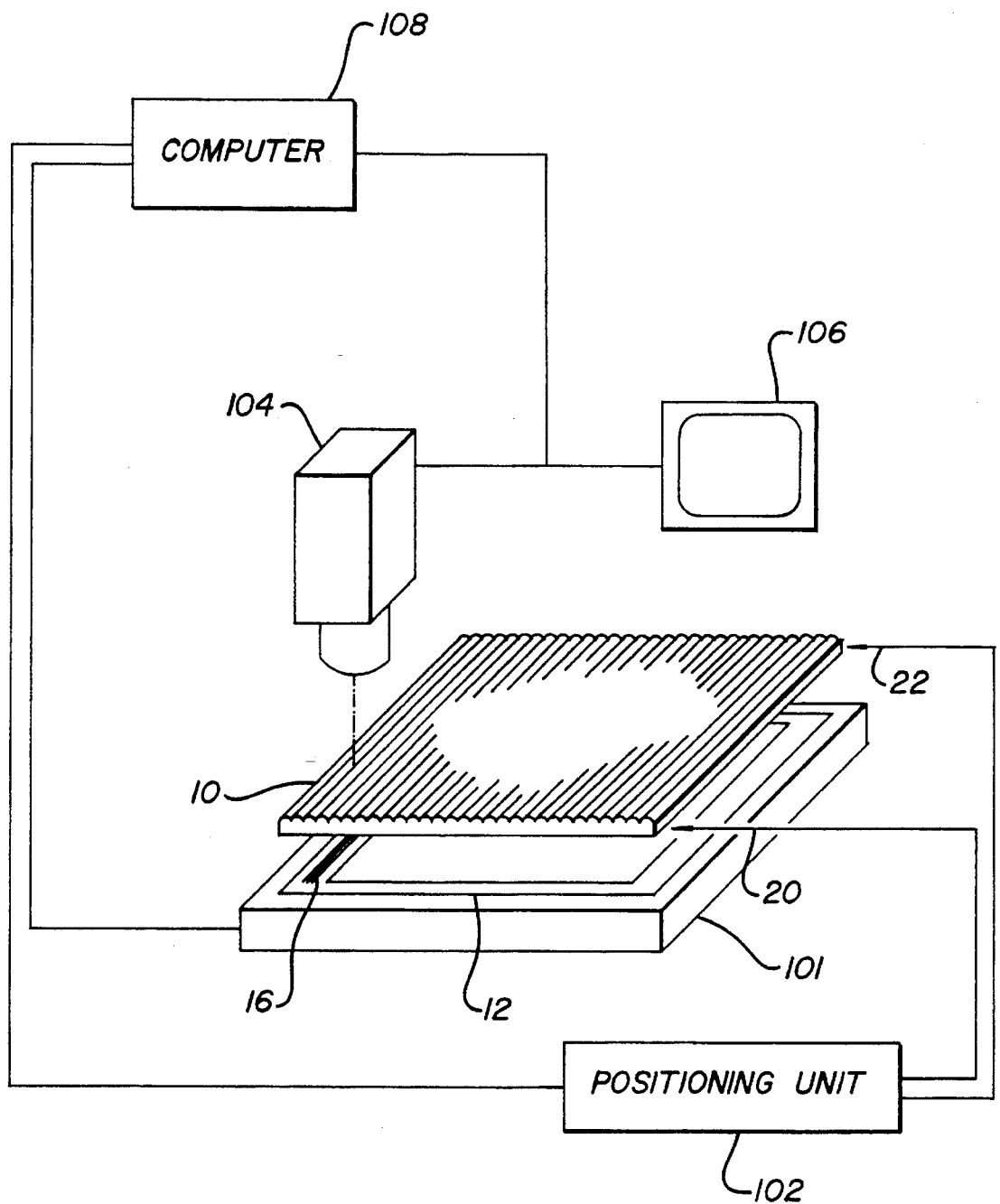
FIG. 12 illustrates the components of the present invention.

FIG. 12 illustrates an equipment component configuration suitable for accomplishing any of the alignment methods previously discussed. The transparency 12 is positioned on and held in a fixed position by a transparent vacuum platen 101 or other means of restraining the print 12 in a fixed position. It is preferable that the platen 101 include bonding ports or holes therethrough which admit a conventional ultrasonic or other bonding device which can be used to bond the overlay 10 to the print 12 when in an aligned position. The overlay 10, in a contacting and slidable relationship with print 12, is held and moved by a positioning unit 102. The positioning unit 102 can include conventional movement devices, such as stepper motors, for providing the motion to overlay contact points 20 and 22. The positioning unit 102 also includes clamping or restraining means which holds the overlay 10 as it is being slidably positioned. A micrometer type clamp or a suction gripper type device attached to the positioning unit 102 will provide the appropriate capability. A conventional camera 104 provides the sensing mechanism and has an appropriate sensing array, such as array 40, positioned therein. The camera 104 can be designed to image the entire area in which the alignment lines are projected when provided with an appropriate lens or the camera 104 can be designed to view only a portion of the area. Of course, as previously discussed, the camera 104 could be a single light sensing element. It is also preferable that the camera 104 image at least two different position along the lines or that two cameras be provided allowing imaging from two different vantage points separated along the lines which allows determination of brightness at the two points, thereby ensuring alignment along the entire length of the image lines. The camera 104 can be aligned directly or normally over the lenticules through which the image of the lines 16 will be projected or off to the side if the lines 16 are correspondingly offset with respect to the lenticules. Although a black and white camera is generally preferred a color camera with colored alignment lines can be used. The predominant color of the image would provide information about the direction of misalignment in this situation. Because the preferred method uses brightness as the measurement characteristic, the camera 104 needs to be calibrated to the light source for the lines 16. This calibration can be performed prior to the alignment operation or continuously during the alignment operation. The source light can be provided through an overlay sample to fall or lie within a small calibrating portion of the view of the camera 104. The output of the camera 104 including the calibration source light as well as the sensed alignment lines can be provided to both a visual display 106 and a computer 108. An appropriate computer would be an IBM PS/2. The computer 108 preferably includes a conventional frame grabber available from Image Technology which will allow capturing of the various curves and/or brightness values previously discussed. The computer 108 analyzes the image produced by the camera 104 in accordance with one of the techniques previously described and appropriately adjusts the position of overlay 10 using the positioning unit 102 until the overlay 10 is in proper rotational and translational alignment. When aligned the print 12 is preferably spot bonded to the overlay 10. Subsequent to the spot bonding additional contact cement can be applied between the print 12 and the overlay 10.

Figure 13:
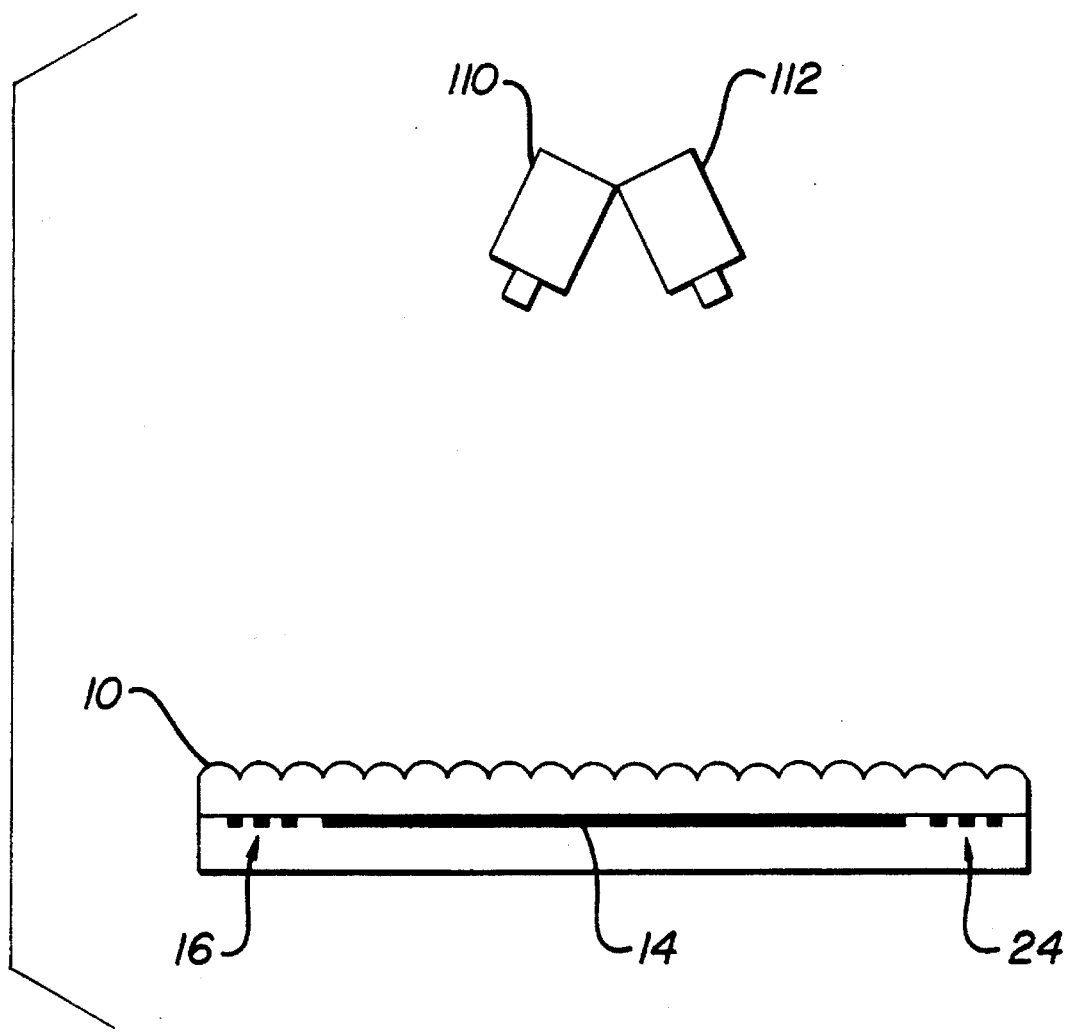
FIG. 13 depicts symmetrical viewing of alignment lines on both sides of the image.

FIG. 13 illustrates an alternate camera arrangement that enhances the ability of the present invention to achieve image and lenticular overlay alignment. Two cameras 110 and 112 image, through overlay 10, alignment lines 16 and 24 positioned on both sides of the image 14. As previously mentioned, this symmetrical, complementary viewing angle arrangement allows the alignment line images on both sides to be differentially compared resulting in a higher accuracy of alignment.

Figure 14A:
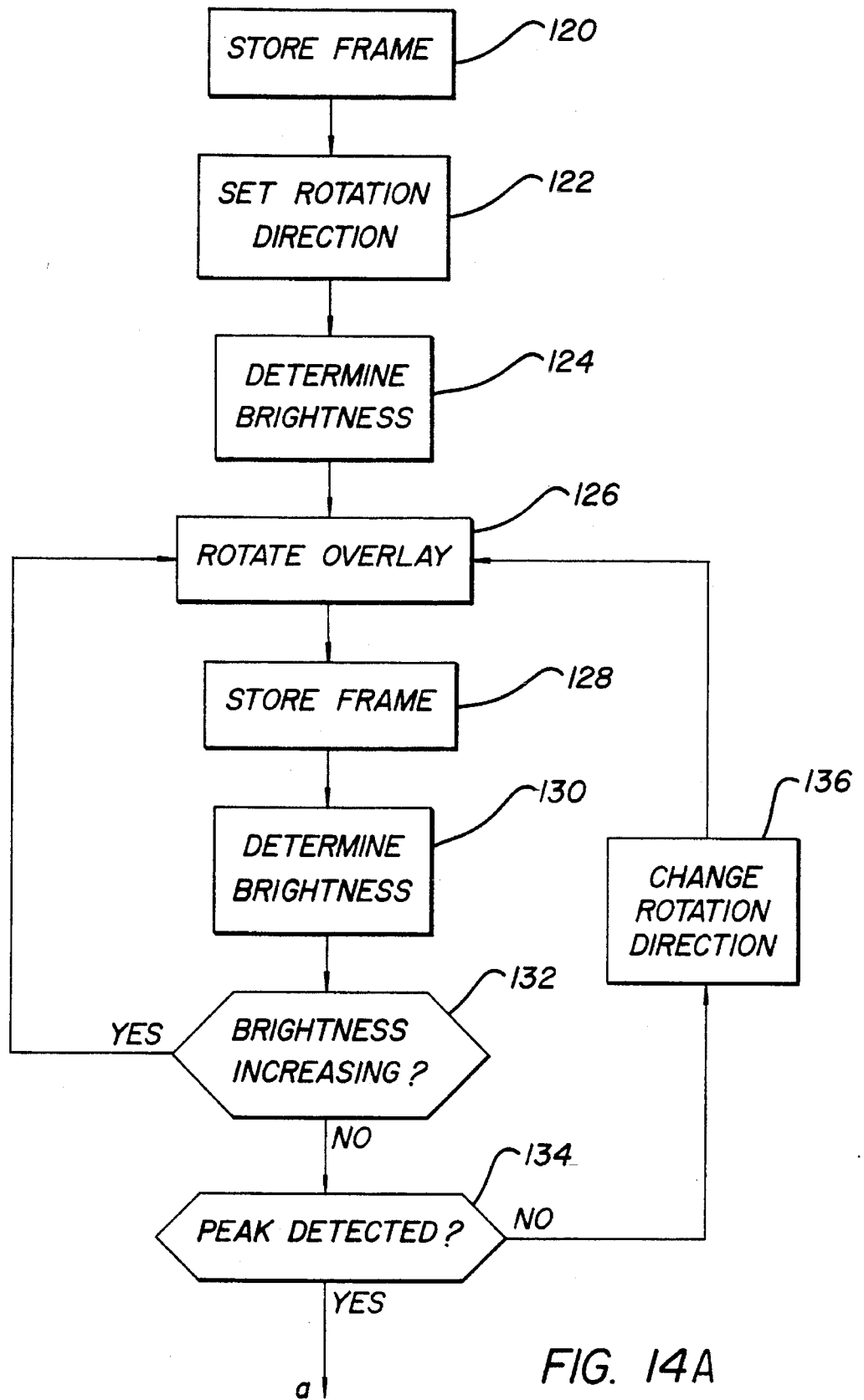
FIG. 14 is a flowchart of the preferred method of determining alignment.
Figure 14B:
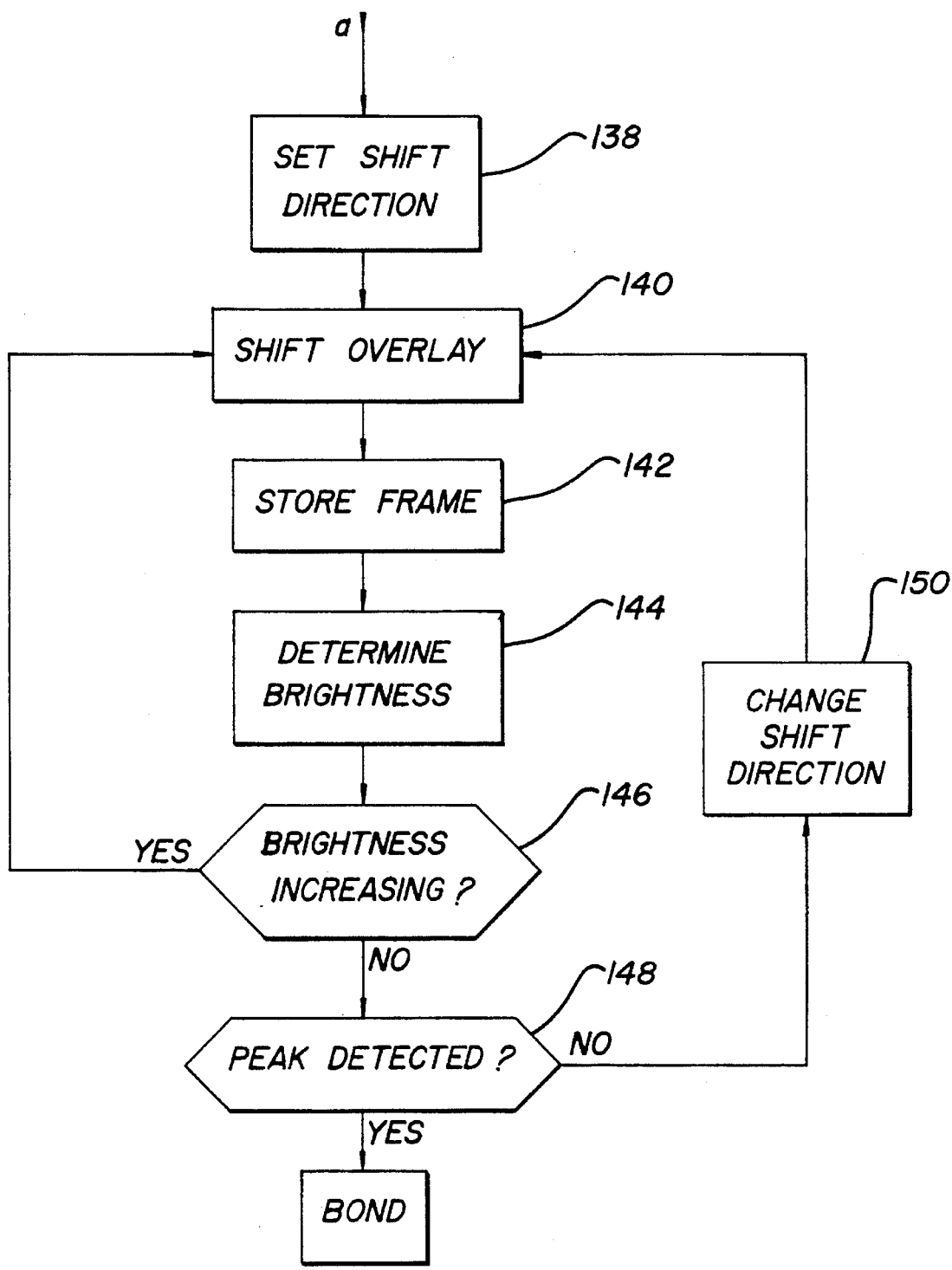

When the computer 108 is performing the preferred brightness method of determining alignment using the approach illustrated in FIG. 3 and FIG. 9 the computer 108 performs a process as illustrated in FIG. 14. The process starts by storing 120 a frame from the camera 104. This is an initialization frame from which the change in brightness will be determined for the next frame. Next the system sets either a clockwise or a counter clockwise rotational direction and then determines 124 the brightness of the previously captured frame. The system then, through positioning unit 102, rotates 126 the overlay by a predetermined amount, such as thirty minutes of arc. Of course continuous rotation at constant a rate is possible with the frame grabber capturing different rotational positions. The next frame is then captured and stored 128 followed by a determination 130 of the brightness of the latest or current captured frame. The current brightness is compared with the prior brightness to determine 132 whether the brightness is increasing. As previously discussed determining brightness at two different vantage points along the alignment lines is preferred. The combined brightness of the two points, using an average, can be compared or the brightness of the points individually can be compared. If the brightness is increasing, the rotation in the rotation direction previously set is continued. If the brightness is not increasing, the system determines 134 whether a peak has been detected. The peak detection can be accomplished by storing at least three previous brightness samples and determining whether a pattern of increasing brightness to decreasing brightness has occurred. Other peak detection techniques can of course be used. If a peak has not been detected and the brightness is not increasing, the rotational direction is changed 136 to rotate in a direction of increasing brightness and better rotational alignment. If a peak has been detected the rotational position alignment is stopped and the system starts the translational shift alignment. Of course with a curve fitting approach the actual peak can be determined and the overlay rotated back to the peak. A shift direction is first set 138 and the overlay is translationally shifted 140 by a predetermined amount, such as 1/30 of the lenticule pitch. Again continuous translation is possible. The system then captures and stores 142 another frame from which the brightness is determined 144. The brightness of the previous stored frame and the current frame is compared 146 to determine whether the brightness is increasing. If so, the shifting in the previously set shift direction continues. If the brightness is not increasing, peak determination is performed 148 to determine whether a peak has been detected. If a peak has been detected, correct translational alignment has been accomplished and the computer sends a bonding command to the bonding unit in the platen 100. Once again using a curve fitting approach the actual peak can be determined and shifted back to the peak. If the peak has not been detected, thereby indicating that the brightness is decreasing, the shift direction is changed 150 to move the overlay in a translational direction of increasing brightness and increasing alignment.

Although the discussion herein has focused on using a single camera viewing a set of alignment lines two cameras viewing different portions of the same set of alignment lines can be used. The brightness levels of the cameras can be compared to provide further assurance that the peak brightness position along the entire length of the alignment lines has been found.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, although the present invention has been described with respect to aligning a lenticular print or transparency with an overlay the same technique can be used to align an image produced by a CRT with a lenticular faceplate. Further, the present invention can be used with integral and barrier type image projection technologies.

What is claimed is:

1. An apparatus, comprising:
    a recording media including an alignment line and an autostereoscopic depth image recorded therein;
    a overlay slidably positioned on said recording media to project the alignment line as a projected image; and
    positioning means positioning said overlay responsive to a characteristic of the projected image of the alignment line and aligning the depth image with the overlay.

2. An apparatus as recited in claim 1, wherein said recording media records a lenticular image and said overlay comprises a lenticular overlay.

3. An apparatus as recited in claim 1, wherein said positioning means positions said overlay responsive to brightness of the projected image at two points along the alignment line.

4. An apparatus as recited in claim 1, wherein said positioning means positions said overlay responsive to a brightness curve of the projected image.

5. An apparatus as recited in claim 1, wherein said positioning means positions said overlay responsive to a number of peaks in a Moire pattern of the projected image.

6. An apparatus as recited in claim 1, wherein said positioning mean positions said overlay responsive to distances between peaks in a Moire pattern of the projected image.

7. An apparatus as recited in claim 1, wherein said positioning means positions said overlay responsive to a frequency of peaks in a Moire pattern of the projected image as said overlay is moved.

8. An apparatus as recited in claim 1, wherein said positioning means positions said overlay responsive to a position of the line in the projected image.

9. An apparatus as recited in claim 1, wherein:
    said recording media includes a recorded image,
    said alignment line comprises a first alignment line recorded on said media on a first side of the recorded image and a second alignment line recorded on said media on a second side of the image opposite to said first side, and
    said apparatus further comprises:
    a first camera viewing the first alignment line;
    a second camera viewing the second alignment line; and
    means for differentially comparing the views of the first and second alignment lines.

10. An apparatus as recited in claim 1, wherein said first and second cameras view the first and second image lines at complementary, symmetrical angles.

11. An apparatus, comprising:
    a recording media including an alignment line and an autostereoscopic depth image recorded therein;
    an overlay slidably positioned on said recording media to project the alignment line as a projected image; and
    positioning means positioning said overlay responsive to a characteristic of the projected image of the alignment line and aligning the depth image with the overlay, said positioning means positioning said overlay rotationally and translationally responsive to the brightness of the projected image at two points along the alignment line.

12. An apparatus, comprising:
    a recording media including an alignment line and an autostereoscopic depth image recorded therein;
    an overlay slidably positioned on said recording media to project the alignment line as a projected image; and
    positioning means positioning said overlay responsive to a characteristic of the projected image of the alignment line and aligning the depth image with the overlay, said positioning means positioning said overlay responsive to a brightness curve of the projected image, positioning rotationally responsive to a shape of the brightness curve and positioning translationally responsive to a position of a peak in the brightness curve.

13. An alignable lenticular apparatus alignable with an overlay, said apparatus comprising:
    a recording media, said recording media including:
    a lenticular image fixed in the media; and
    an alignment line fixed in the media and adjacent to said image for aligning said media to the overlay.

14. An apparatus as recited in claim 13, wherein the overlay comprises a lenticular overlay in contact with said media.

15. An apparatus, comprising:

a recording media including alignment lines and an autostereoscopic depth image recorded therein;

a lenticular overlay slidably positioned on said recording media to project the alignment lines as a projected image;

a light sensor sensing the projected image of the alignment lines;

a positioning unit coupled to said overlay; and a computer, connected to said light sensor and said positioning unit, positioning said overlay into alignment with said recording media responsive to the projected image of the alignment lines and aligning the depth image with said overlay, the projected image including a Moire pattern when misalignment exists, the Moire pattern having a higher brightness level at two points along the alignment lines as rotational alignment is increased, the projected image including a continuous line pattern when in rotational alignment, the continuous line pattern having the higher brightness level as translational alignment is increased.

16. A method of aligning a recording media, including an autostereoscopic depth image, with an overlay, comprising the steps of:

(a) fixing an alignment line in the recording media to project a projected image of the line through the overlay;

(b) moving the overlay with respect to the media;

(c) comparing the projected images of the line before and after moving; and (d) moving the overlay into alignment responsive to the comparison and aligning the overlay and the depth image.

17. A method as recited in claim 16, wherein step (c) comprises comparing projected image brightness of two points along the alignment line.

18. A method as recited in claim 16, wherein step (c) comprises comparing curve shapes.

19. A method as recited in claim 16, wherein step (c) comprises comparing peak distances in a Moire pattern.

20. A method is recited in claim 16, wherein step (c) comprises comparing peak frequency in a Moire pattern.

21. A method as recited in claim 16, wherein step (c) comprises comparing line positions.

22. A method as recited in claim 16, wherein step (a) comprises fixing first and second alignment lines on opposite sides of a recorded image and step (c) comprises differentially comparing the projected images.

23. A method of aligning a recording media, including a lenticular image and alignment lines, with a lenticular overlay producing a projected image of the alignment lines, comprising the steps of:

(a) rotationally moving the overlay with respect to the recording media;

(b) determining first brightness changes in the projected image at two points along the alignment lines during the rotational movement;

(c) rotationally moving the overlay and the recording media image into rotational alignment responsive to the first brightness changes;

(d) translationally moving the overlay with respect to the projected image;

(e) determining second brightness changes in the projected image at the two points during the translational movement; and (f) translationally moving the overlay and the recording media into translational alignment responsive to the second brightness changes aligning the depth image and the overlay.

* * * * *